US012808603B2

(12) United States Patent
Hryniuk

(10) Patent No.: US 12,808,603 B2
(45) Date of Patent: Nov. 24, 2026

(54) APPARATUS FOR STORING DRY MATERIAL

(71) Applicant: Mark Frederick Hryniuk, Saskatoon (CA)

(72) Inventor: Mark Frederick Hryniuk, Saskatoon (CA)

( * ) Notice: Subject to any disclaimer, the term of this patent is extended or adjusted under 35 U.S.C. 154(b) by 316 days.

(21) Appl. No.: 18/772,588

(22) Filed: Jul. 15, 2024

(65) Prior Publication Data

US 2024/0369298 A1 Nov. 7, 2024

Related U.S. Application Data

(63) Continuation-in-part of application No. 17/684,789, filed on Mar. 2, 2022, now Pat. No. 12,290,026.

(51) Int. Cl.
*F26B 9/10* (2006.01)

(52) U.S. Cl.
CPC .......... *F26B 9/103* (2013.01); *F26B 2200/06* (2013.01)

(58) Field of Classification Search
CPC .... F26B 9/103; F26B 2200/06; A01F 25/166; A01F 25/186
USPC .......................................................... 34/218
See application file for complete search history.

(56) References Cited

U.S. PATENT DOCUMENTS

| | | | | | |
|---|---|---|---|---|---|
| 4,038,021 | A * | 7/1977 | Benson | F26B 11/0445 432/118 |
| 5,561,916 | A * | 10/1996 | Willgohs | F26B 3/084 34/169 |
| 8,844,157 | B2 * | 9/2014 | Wagner, Jr | F26B 25/06 34/361 |
| 10,433,490 | B2 * | 10/2019 | Trucke | E04H 7/24 |
| 11,314,213 | B1 * | 4/2022 | Harweger | G05B 13/048 |
| 11,839,181 | B2 * | 12/2023 | Koch | A01F 25/22 |
| 11,852,409 | B2 * | 12/2023 | Maendel | F23G 7/10 |
| 11,968,925 | B2 * | 4/2024 | Ceglinski | A01D 45/021 |
| 12,181,218 | B2 * | 12/2024 | Heilskov | F26B 17/1425 |
| 12,290,026 | B2 * | 5/2025 | Hryniuk | B65G 33/14 |
| 2022/0279727 | A1 * | 9/2022 | Hryniuk | B65G 33/265 |
| 2023/0284567 | A1 * | 9/2023 | Johnson | A01F 25/186 |
| 2024/0369298 | A1 * | 11/2024 | Hryniuk | F26B 9/103 |

FOREIGN PATENT DOCUMENTS

| | | | | | |
|---|---|---|---|---|---|
| CN | 114760831 | A * | 7/2022 | F26B 3/00 |
| KR | 2023036637 | A * | 3/2023 | |
| WO | WO-2021113392 | A1 * | 6/2021 | F26B 3/00 |

* cited by examiner

*Primary Examiner* — Stephen M Gravini
(74) *Attorney, Agent, or Firm* — W Scott Keeley; Keeley DeAngelo LLP

(57) ABSTRACT

A modular, low-profile apparatus for storing dry agricultural products has a horizontal configuration with coaxial aeration tubes and baffles that provide axial voids in the storage module when it is full of grain. Voids are vented to ambient environment providing even drying with reduced energy. The apparatus further has bi-directional distribution and dispensing augers. The apparatus provides access to dry agriculture products for drying, storing, mixing, aerating, loading, unloading and processing.

12 Claims, 4 Drawing Sheets

100

100

APPARATUS FOR STORING DRY MATERIAL

TECHNICAL FIELD

The invention relates to agricultural equipment and related grain storage and more specifically to aeration systems for agricultural material, and dispensing and distribution systems for stored grain.

BACKGROUND

Agricultural crops are commonly stored in vertical cylindrical storage facilities at farms, cooperatives or corporation locations that store grain after harvesting.

Aeration systems and techniques have been developed to aerate stored grain. Moving air through stored grain balances humidity levels, with the result of reducing grain spoilage, preventing storage losses. By maintaining a cool, uniform temperature during a storage duration, aeration reduces mold, microbial and insect activity, and prevents moisture migration.

Storing, mixing and dispensing grain all require access to the grain. Common grain-storage facilities are silos, which are vertically oriented. An air-delivery system is commonly a vented duct where the air passes through grain to a vent. A poor air-delivery system will restrict air flow into the grain, which wastes energy. Conventional storage bins are designed to accommodate vertical airflow. Full-floor aeration, used in conventional storage bins, is currently the most effective method in the state of the art for moving high volumes of air through grain mass. A fan moves air through a full-floor air-delivery system so that air flows upward through the grain to a vent at the top of the storage bin. As the bin is filled, the increased height of the grain provides a relatively longer airflow path from a fan to a vent. A partially filled bin provides a relatively shorter flow path with lower friction and increased airflow. Each type of grain has a different friction factor, which is affected by chaff and weed seeds.

A horizontally oriented apparatus combined with an aeration device enables uniform distribution of air, resulting in consistent moisture content of the stored material.

SUMMARY

An apparatus for storing dry agricultural products is oriented in a horizontal, low-profile bin/module system. The modular storage unit, horizontally configured, provides access to dry agriculture products (such as grain) for storing, mixing, aerating, loading, unloading and processing. The apparatus's orientation may be understood to resemble that of a silo that has been split in two and reoriented horizontally, the split forming two halves of a horizontal storage bin. The interior, long side walls of these substantially halved storage modules (also referred to as bins) are constructed taller than those of the exterior sides so as to increase storage volume.

In one embodiment, two semi-cylindrical storage modules are joined along their interior, long side walls to form a double-module storage apparatus. Each module has a semi-cylindrical portion that transitions to a sloped roof. A long central axis resides at the center of the semi-cylindrical portion. An aeration tube, disposed coaxially in the semi-cylindrical portion, extends the length of the storage module and is open at each end. In some embodiments at least one fan is connected to an end of the aeration tube, providing air movement and consistent moisture control. One skilled in the art understands that any number of aeration tubes and associated fans may be disposed within the storage module.

Angled baffles mounted on the sidewalls provide axial voids that extend to each end wall. Axial voids are parallel to the central axis. As dry material is removed from the bin through lower augers, the angled baffles do not impede the flow of dry material as the slope of the angle is generally in the direction of flow out of the storage module. In some embodiments, angled baffles slope downward, toward lower augers, at an angle that is greater than 90° and less than 179° to a vertical reference. Controlled air moves through the aeration tubes, through the stored grain, to axial voids, to vents. Air flows through the grain, radiating outward from an aeration tube in a relatively short path from aeration tube to axial vent. This results in evenly aerated grain, without a reduction in aeration quality between a partially filled bin and a full bin; and requires less energy to run the fan(s) compared to that of a vertical grain-storage bin. Angled baffles are rigid reinforcement members that add strength to the storage-module structure.

At the top of the apparatus, a load auger assists in spread-loading introduced dry material across the upper length of the apparatus and into the storage bins. In the bottom of the apparatus, unload augers are for mixing and dispensing grain.

The top auger is bidirectional, moving grain laterally in two directions once the grain is introduced via exterior receptacles. One side of the auger has a right-hand thread, effecting a clockwise, helical form, originating from the center of the auger and terminating at a first end of the auger. The opposite side of the auger has a left-hand thread, effecting a counterclockwise helical form, originating from the center of the auger and terminating at a second end. Such an auger can spread grain along the length of the apparatus when the grain is loaded from the center. In another example use, the bidirectional auger can spread grain along the length of the apparatus when the grain is loaded from either or both ends of the storage module.

One skilled in the art understands that the auger's shaft can turn in a first direction (clockwise) and in a second direction (counterclockwise). As the shaft rotates in a first direction, grain is conducted inward. This direction is for loading the grain from terminal-end receptacles of the apparatus. When the shaft rotates in a second direction, the reversed direction of the helical threads directs the grain outward from the center area. This direction is for loading the grain from a receptacle at the center of the apparatus. One skilled in the art understands that an auger may be driven by a direct-drive motor, by a motor-and-belt-combination, or by similar mechanism.

The top auger has apertures along its length so that grain may be dropped across the entirety of the storage bin. If the grain capacity reaches to the augers, augers may continue to turn to push grain up until the bin is completely full.

A U-shaped channel beneath each auger has evenly spaced gaps for catching and dispensing grain.

A lower bidirectional auger is disposed along the bottom of each semi-cylindrical storage module. It assists in dispensing stored dry material. Caps, understood in the art, are disposed above and along the length of the dispensing auger to prevent the weight of stored material from resting on the dispensing auger, and to allow the flow of grain through the auger for dispensing. In some embodiments, the upper auger has a cap to protect dry material from weather. A cap may have one or more openings.

One skilled in the art is familiar with various dry material stored in storage vessels and intended to remain dry. Any dry, granular substance may be stored in a dry storage container. For the purpose of clarity dry granular material is referred to as grain in this disclosure.

Presented drawings of these embodiments are understood as illustrative and not limiting.

DESCRIPTION

Figure 1:
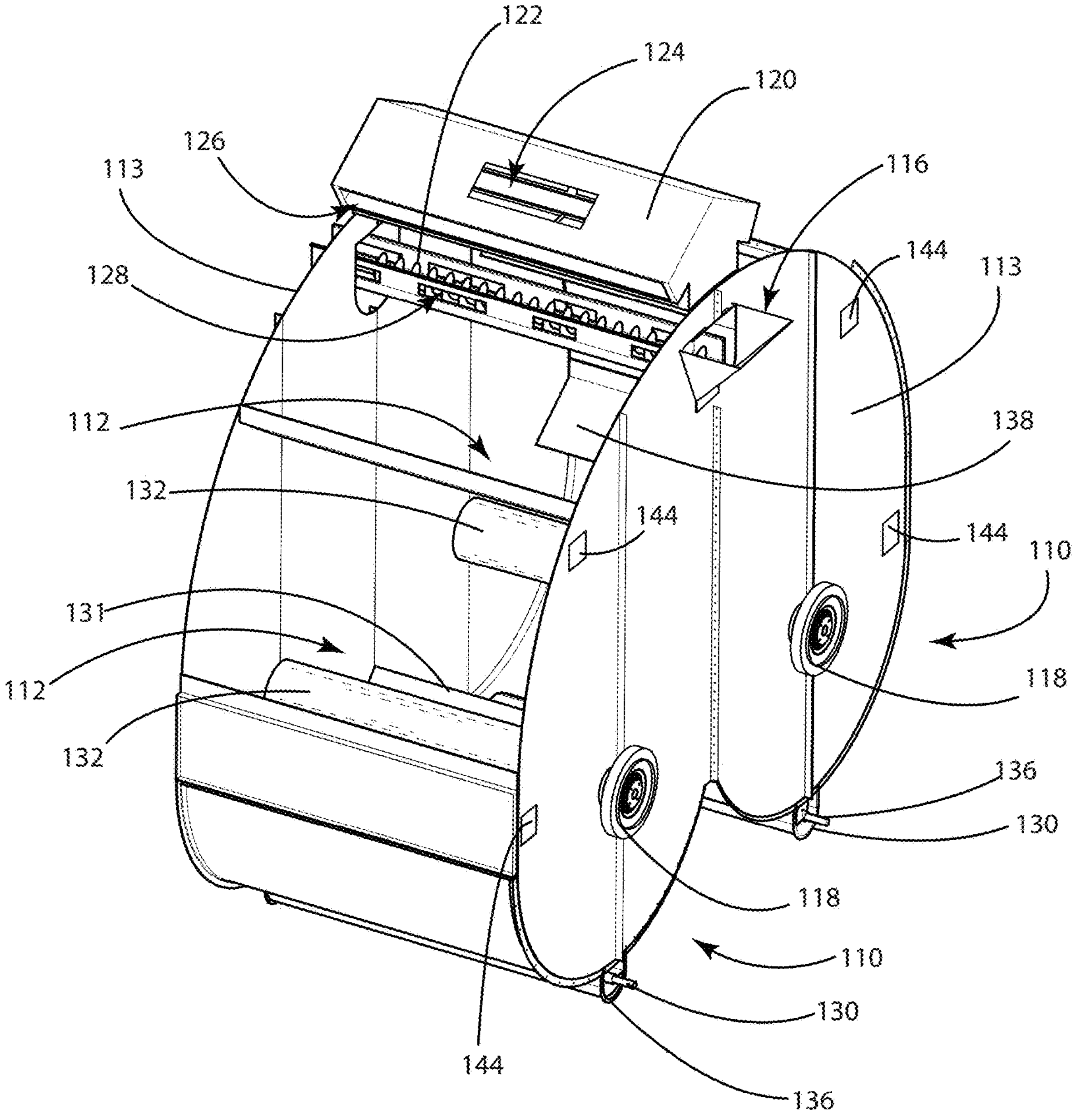
FIG. 1 is a perspective, partial-cutaway view of an example embodiment of the present disclosure.
Figure 2:
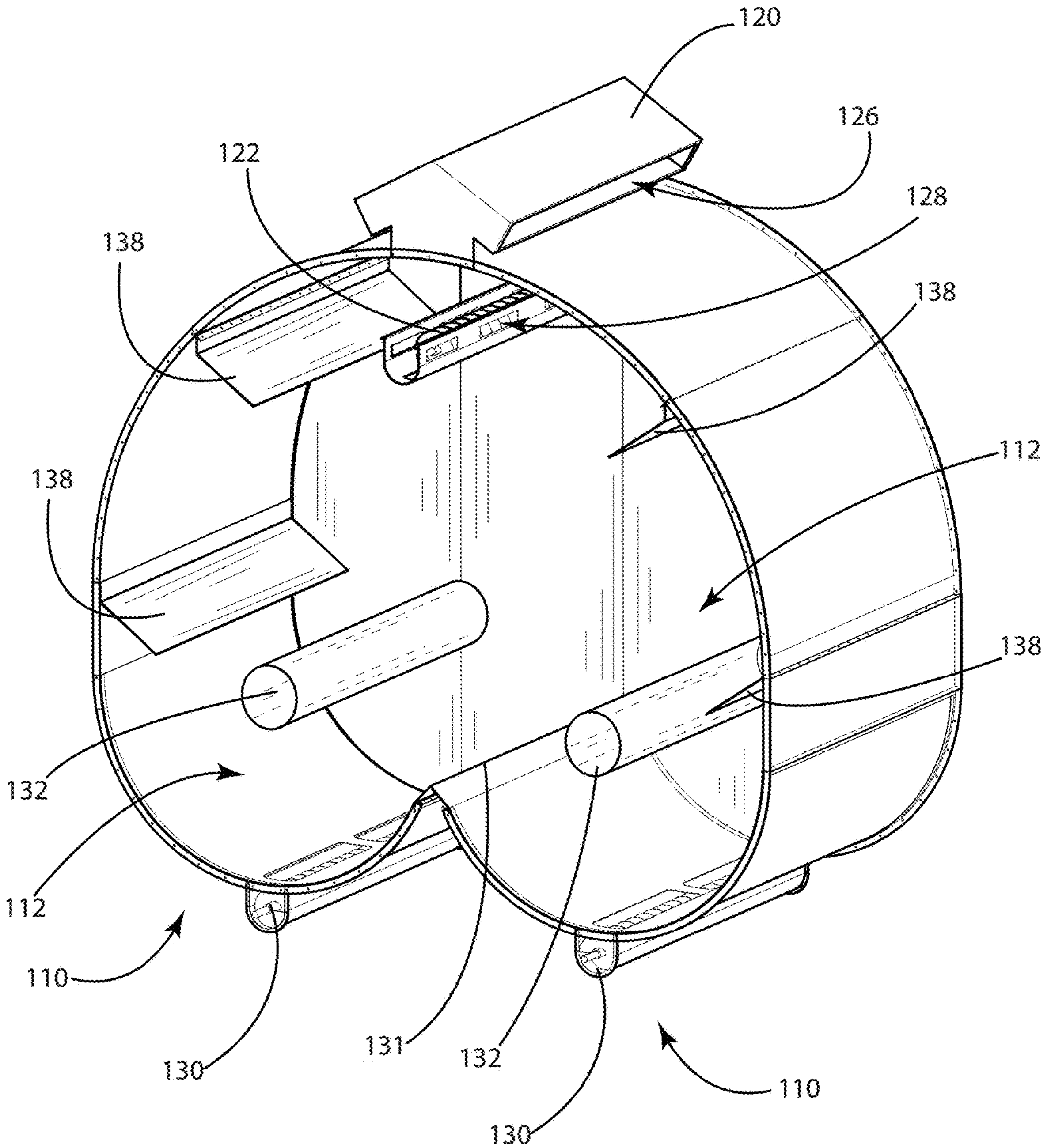
FIG. 2 is a perspective, partial-cutaway view of an example embodiment.
Figure 3:
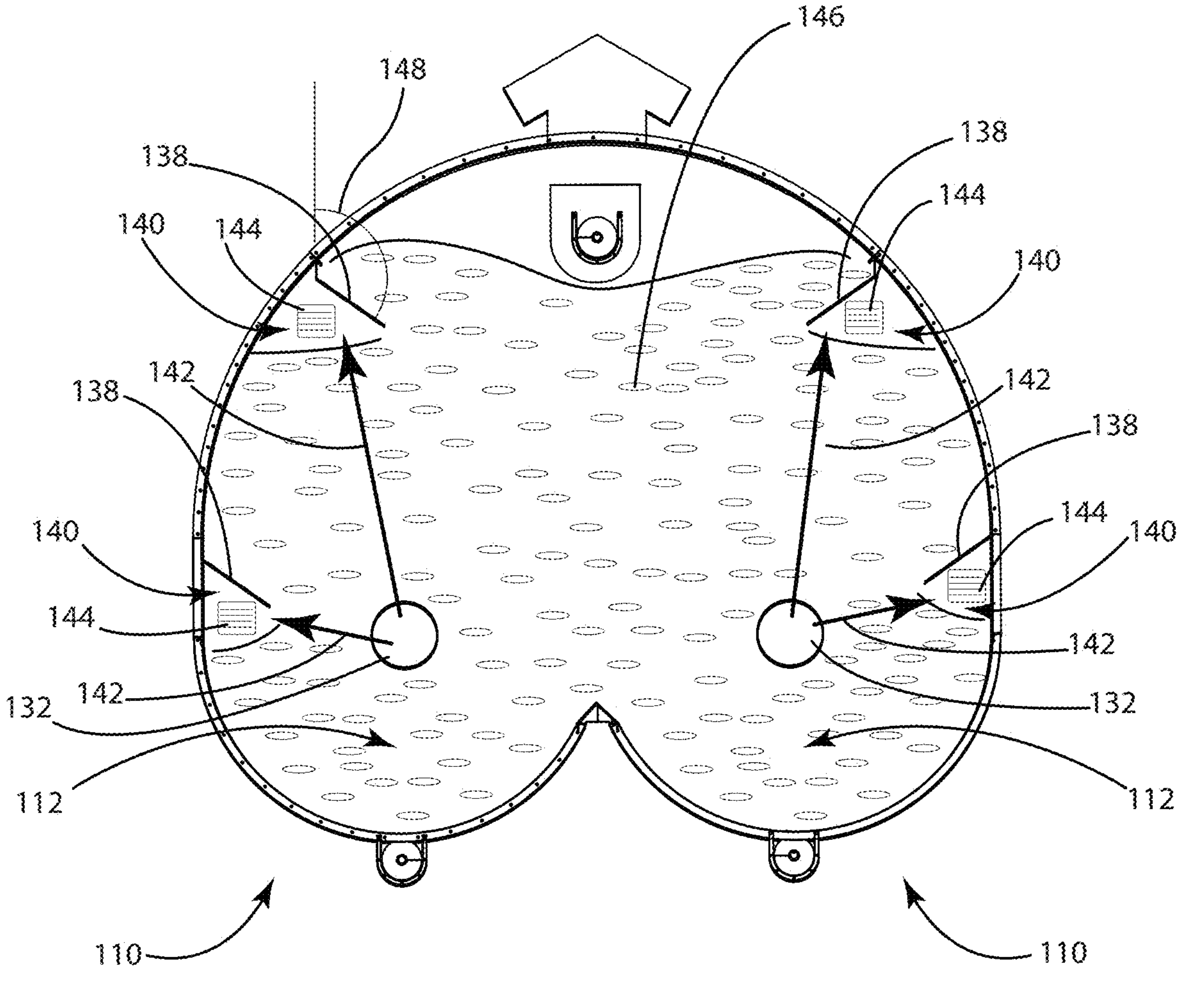
FIG. 3 is a side cross-sectional view of an example embodiment.

FIG. 1, FIG. 2, and FIG. 3 illustrate various views of an example embodiment 100 of the disclosure. Two semi-cylindrical storage modules 110 are joined along the a long edge that makes up the apparatus's long axis 131. Aeration tubes 132 are disposed coaxially in each semi-cylindrical storage module 110. Aeration tubes 132 have permeable sidewalls and may be constructed of perforated, thin-walled material such as plastic, sheet metal, expanded metal mesh or screening. One skilled in the art is familiar with materials that may be used to form an air-permeable tube. Aeration tubes extend through end walls 113, also referred to as terminal walls, and are open to the ambient atmosphere. A fan 118 may be joined at any of the openings of aeration tubes. Fan(s) 118 send air into aeration tubes 132 to control the moisture content of dry material in the storage modules 110. Grain is stored in the paired interior areas 112. Baffles 138 are designed to create voids 140 in the grain 146 when the bin is full. One skilled in the art understands that the grain in the illustration is not to scale, but only a texture is represented to show the areas where grain 146 will deposit when filling the bin and where voids 140 will reside. Airflow represented by arrows 142 moves from aeration tubes 132, through grain 146 wherein some air flows into voids 140 and out vents 144 to the exterior of the storage bin. One skilled in the art understands that the paths to the voids 140, created by baffles 138, and thus on to vents 144, is a relatively shorter path than one through a similar mass of grain without voids 140 and vents 144. Shorter airflow paths through a mass of grain reduces the amount of static pressure required of fans 118 and provides a shorter drying time with less energy use than that of a grain bin without baffles 138, voids 140 and vents 144. Angled baffles 138 slope downward towards the bottom of the storage module. In some embodiments the angled baffles 138 slope downwards at an angle represented by dimension 148, that is greater than 90° and less than 179°. In one embodiment the angled baffles slope downward at an angle that is between 115° and 135° and preferably 125°.

In an example embodiment, an upper auger 122 resides above the storage modules 110 along the joined, long edges of the modules 131. A cap 120 protects dry material from the elements.

In some embodiments the upper auger 122 has a clockwise thread disposed from the center of the apparatus to one end and a counter-clockwise thread disposed from the center of the apparatus to the opposite end. This is referred to as a bi-directional auger. Material loaded into the apparatus at receptacle 124 may be spread evenly along the storage areas 112 by the auger 122. Dry material loaded via terminal receptacle(s) 116 is distributed toward the center of the storage modules 112. One skilled in the art understands that driving the auger in a particular direction distributes material into receptacle 124 from the center of the apparatus to both ends, and by reversing the auger's 124 rotational direction, material is evenly distributed from the receptacle 116 toward the center of the storage modules 112. One skilled in the art understands that there are various ways to access the modules, such as through a receptacle 124, or the same may be achieved by way of flaps, hatches, and the like, to pour grain into the modules while keeping out rain and wind.

External augers 130, coaxially disposed below each of the storage areas 112, are configured to dispense dry material. One skilled in the art understands how such augers may reside above a U-shaped channel 136, with openings above and below, to dispense dry material.

Figure 4:
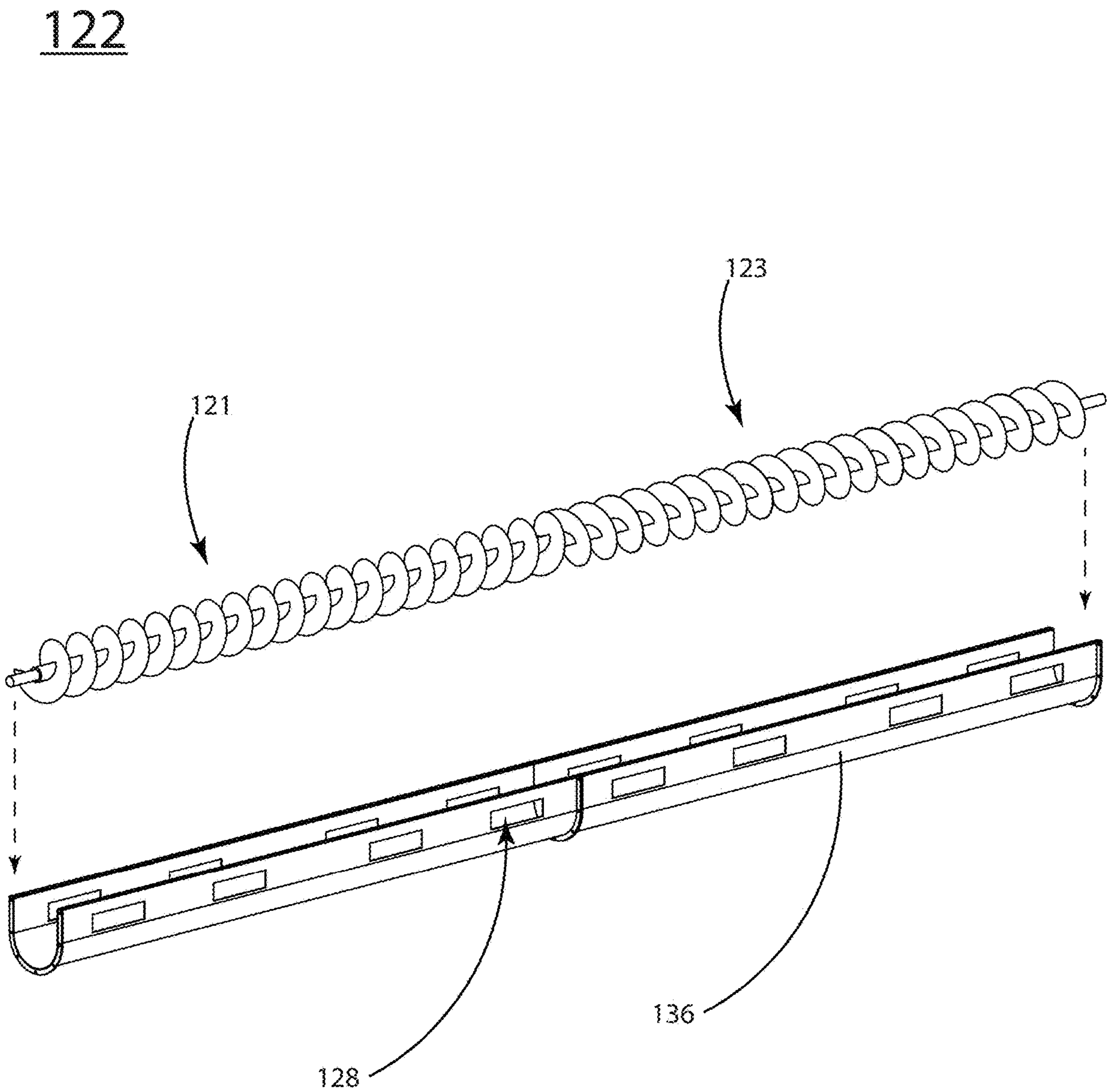
FIG. 4 is an exploded view of parts of the embodiment.

In FIG. 4 opposing threads 121 and 123 can be seen on a bidirectional auger 122. A U-shaped channel 136 is disposed beneath each auger of the apparatus. The channel has evenly spaced gaps 128 for dispersing grain. One skilled in the art understands that similar openings may be used in lower augers for dispensing grain.

The invention claimed is:

1. An apparatus for storing dry agricultural material comprising:

at least one horizontal, semi-cylindrical storage module having a center, an interior, an exterior, a long axis, a first terminal wall and a second terminal wall; and at least one sidewall connecting said first terminal wall and said second terminal wall; and at least one aeration tube, coaxial with said cylindrical storage module long axis, piercing said terminal first terminal wall and said second terminal wall; and at least one baffle fixedly engaged with said at least one sidewall extending from said first terminal wall and said second terminal wall; and vents in said first terminal wall and said second terminal wall proximal to said at least one baffle; wherein said at least one baffle provides voids in stored dry agricultural material; and wherein at least a portion of air flowing through said aeration tube flows through said dry agricultural material to said voids and out said vents.

2. The apparatus of claim 1 further comprising:

at least one aeration fan in fluid communication between said exterior of said storage module and an interior of said at least one aeration tube; wherein the aeration fan moves air through said aeration tube.

3. The apparatus of claim 1 wherein:

said at least one baffle is fixedly engaged with said at least one sidewall at an angle to a vertical reference of between about 115° and 135°.

4. The apparatus of claim 1 further comprising:

at least one upper auger residing above said aeration tube and parallel to said semi-cylindrical storage module long axis; and said at least one upper auger having a clockwise thread disposed from approximately a center of the semi-cylindrical storage module to said first terminal wall; and having a counter-clockwise thread disposed from approximately the center of the semi-cylindrical storage module to said second terminal wall; wherein feeding dry agricultural material into the center of said at least one upper auger, while said auger is rotating, disperses said dry agricultural material from the center of said storage module toward said first terminal wall and toward said second terminal wall.

5. The apparatus of claim 4 further comprising:

a cap covering the length of said at least one upper auger, and a least one aperture at the end, the aperture having a lid; wherein the lid may be opened to pour in the dry agricultural material.

6. The apparatus of claim 4 further comprising:

at least a first lower auger disposed below said aeration tube and parallel to said storage module long axis, the auger having a clockwise thread comprising substantially one half of the auger, and a counter-clockwise thread comprising substantially the other half the auger, and a channel partially surrounding the bottom of said at least a first lower auger; and at least one aperture in said channel; wherein dry agricultural material is moved from an area proximal to said first terminal wall and from an area proximal to said second terminal wall toward said at least one aperture and is dispensed through the at least one aperture in said channel.

7. An apparatus for storing dry agricultural material comprising:

at least two semi-cylindrical storage modules paired side by side, in fluid communication with one another;

each module having a center, an interior, an exterior, a long axis, and a first terminal wall and a second terminal wall join said at least two semi-cylindrical storage modules; and at least one sidewall joins said first terminal wall and said second terminal wall; and at least one aeration tube in fluid communication with said first terminal wall and said second terminal wall; and said aeration tube is coaxial with said storage module long axes, piercing said first terminal wall and said second terminal wall; and said aeration tubes in fluid communication with said exterior of said storage module; and at least one baffle fixedly engaged with said at least one sidewall extending from said first terminal wall and said second terminal wall; and vents in said first terminal wall and said second terminal wall proximal to said at least one baffle; wherein said at least one baffle provides voids in said stored dry agricultural material; and wherein at least a portion of air flowing through said aeration tube flows through said dry agricultural material to said voids and out said vents.

8. The apparatus of claim 7 further comprising:

at least one upper auger residing above said aeration tubes and parallel to said storage module long axes; and said at least one upper auger having a clockwise thread disposed from approximately a center of the storage module to the first end; and having a counter-clockwise thread disposed from approximately the center of said storage module to said second end; wherein feeding dry agricultural material into the center of said upper auger, while said auger is rotating, disperses said dry agricultural material from the center toward said first terminal wall and said second terminal wall; and reversing the direction of said upper auger, feeding dry agricultural material into an opening at one end of said upper auger, dispersing said dry agricultural material from an said first terminal wall toward the center of the storage module.

9. The apparatus of claim 7 further comprising:

at least one aeration fan in fluid communication between said exterior of said storage module and an interior of said at least one aeration tube, and engaged with said aeration tube; wherein the aeration fan expels air through into said dry agricultural material; and through said at least one baffle, along said void and out said vent.

10. The apparatus of claim 7 further comprising:

at least two lower augers residing below each of said at least two aeration tubes and parallel to said storage module long axes, each lower auger having a clockwise thread disposed from approximately a center of the semi-cylindrical storage module to the first end; and having a counter-clockwise thread disposed from approximately the center of the semi-cylindrical storage module to the second end; and at least one opening in said storage module proximal to each of said at least two lower augers, having an open position and a closed position; wherein with the opening in the open position, rotating said at least one of said at least two lower augers dispenses said dry agricultural material from said first end and said second end of the storage module.

11. A method of using the apparatus of claim 7, the method comprising:

feeding dry agricultural material into the center of said at least one upper auger, engaging said at least one upper auger to rotate in a first direction;

dispersing said dry agricultural material from the center to the first and second ends of said storage module; wherein as dry agricultural material pours through two lower augers it causes said two lower augers to rotate in a first direction, moving said dry agricultural material from the first end and second end of said interior of said storage module to the center of said exterior of said storage module.

12. A method of using the apparatus of claim 7, the method comprising:

feeding dry agricultural material into the center of said at least one upper auger;

engaging said at least one upper auger to rotate;

dispersing said dry agricultural material from the first terminal wall and the second terminal wall of said storage module to the center of the storage module; and rotating two lower augers, and moving said dry agricultural material from the center of said interior of said storage module to said first end and to said second end of said exterior of said storage module; and dispensing said dry agricultural material.

* * * * *